(12) United States Patent
Seo (10) Patent No.: US 9,263,726 B2
(45) Date of Patent: Feb. 16, 2016

(54) SECONDARY BATTERY

(75) Inventor: Youngho Seo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 623 days.

(21) Appl. No.: 12/950,965

(22) Filed: Nov. 19, 2010

(65) Prior Publication Data

US 2011/0129701 A1 Jun. 2, 2011

(30) Foreign Application Priority Data

Nov. 30, 2009 (KR) ........................ 10-2009-0116504

(51) Int. Cl.
*H01M 4/04* (2006.01)
*H01M 2/26* (2006.01)
*H01M 10/04* (2006.01)

(52) U.S. Cl.
CPC ............ *H01M 4/0404* (2013.01); *H01M 2/263* (2013.01); *H01M 2/266* (2013.01); *H01M 10/0431* (2013.01); *Y10T 29/4921* (2015.01); *Y10T 29/49115* (2015.01)

(58) Field of Classification Search
CPC . H01M 2/263; H01M 10/0431; H01M 2/266; H01M 4/0404
See application file for complete search history.

(56) References Cited

U.S. PATENT DOCUMENTS 4,154,908 A * 5/1979 Menard .......................... 429/206
6,234,225 B1 * 5/2001 Tanaka et al. .................. 156/390

(Continued)

FOREIGN PATENT DOCUMENTS

CN 1841835 A 10/2006
CN 101393996 A 3/2009

(Continued)

OTHER PUBLICATIONS

Japanese Office Action dated Sep. 25, 2012 for Japanese Patent Application No. JP 2010-143582 which shares priority of Korean Patent Application No. KR 10-2009-0116504 with captioned U.S. Appl. No. 12/950,965.

(Continued)

*Primary Examiner* — Barbara Gilliam
*Assistant Examiner* — Angela Martin
(74) *Attorney, Agent, or Firm* — Knobbe, Martens, Olson & Bear, LLP (57) ABSTRACT

A secondary battery is disclosed. In one embodiment, the secondary battery includes i) a first electrode plate having two opposing surfaces, wherein the first electrode plate comprises a first electrode collector and a first electrode coating portion disposed on at least one of the two surfaces of the first electrode collector and ii) a second electrode plate having two opposing surfaces, wherein the second electrode plate comprises a second electrode collector and a second electrode coating portion disposed on at least one of the two surfaces of the second electrode collector. The secondary battery may further include a separator disposed between the first and second electrode plates and electrically insulating the first and second electrode plates from each other. The first electrode plate may further include a first electrode tab that extends from a first side surface of the first electrode collector, wherein the first side surface connects the two opposing surfaces of the first electrode collector, and wherein the first electrode coating portion extends to an extension region of the first electrode tab. The second electrode plate may further include a second electrode tab that extends from a second side surface of the second electrode collector, where in the second side surface connects the two opposing surfaces of the second electrode collector, and wherein the second electrode coating portion extends to an extension region of the second electrode tab.

11 Claims, 8 Drawing Sheets

(56) References Cited

U.S. PATENT DOCUMENTS

| | | |
|---|---|---|
| 2006/0216591 A1 | 9/2006 | Lee |
| 2007/0154785 A1 | 7/2007 | Seo et al. |
| 2009/0081539 A1 | 3/2009 | Koh et al. |
| 2009/0208825 A1* | 8/2009 | Lee .............................. 429/94 |
| 2009/0263703 A1 | 10/2009 | Kim |

FOREIGN PATENT DOCUMENTS

| | | | | |
|---|---|---|---|---|
| JP | 10-214616 | * | 8/1998 | .............. H01M 4/04 |
| JP | 10-214616 A | | 8/1998 | |
| JP | 11-273661 | | 10/1999 | |
| JP | 2003-068279 A | | 3/2003 | |
| JP | 2006-139919 | * | 6/2006 | .............. H01M 4/02 |
| JP | 2006-139919 A | | 6/2006 | |
| JP | 2006-278331 A | | 10/2006 | |
| JP | 2007-184241 A | | 7/2007 | |
| JP | 2009-224319 A | | 10/2009 | |
| JP | 2010-080392 A | | 4/2010 | |
| JP | 2010-086813 A | | 4/2010 | |
| KR | 10-2008-0030698 | | 4/2008 | |

OTHER PUBLICATIONS

Korean Office Action dated Oct. 10, 2011 for Korean Patent Application No. KR 10-2009-0116504 which corresponds to captioned U.S. Appl. No. 12/950,965.

European Search Report dated Feb. 15, 2011 Issued by the EPO for European Application No. EP10252035.0 which is related to the captioned application.

Chinese Office Action dated Dec. 17, 2012 for Chinese Patent Application No. CN 201010565483.1 which shares priority of Korean Patent Application No. KR 10-2009-0116504 with captioned U.S. Appl. No. 12/950,965.

* cited by examiner

SECONDARY BATTERY

CROSS-REFERENCE TO RELATED APPLICATION

This application claims priority to and the benefit of Korean Patent Application No. 10-2009-0116504, filed on Nov. 30, 2009, the entire content of which is incorporated herein by reference.

BACKGROUND

1. Field

Embodiments of the invention relate to a secondary battery.

2. Description of the Related Technology

As electronic communication and computer technologies have advanced, portable electronic appliances have emerged for many practical applications as a source for power.

In general, a secondary battery includes an electrode assembly that is configured by a positive electrode plate, a negative electrode plate, and a separator disposed between the electrode plates.

SUMMARY OF CERTAIN INVENTIVE ASPECTS

One aspect is a secondary battery that secures uniformity between electrode plates.

Another aspect is a secondary battery including electrode coating portions that are uniformly disposed on electrode plates.

Another aspect is a method of fabricating an electrode plate of a secondary battery, in which a parent electrode collector including electrode coating portions in predetermined regions is stamped to form electrode plates including electrode tabs, so that inclined portions of the electrode coating portions are disposed at predetermined positions of the electrode tabs.

Another aspect is a secondary battery including: a first electrode plate including a first electrode collector and a first electrode coating portion disposed on at least one surface of the first electrode collector; a second electrode plate including a second electrode collector and a second electrode coating portion disposed on at least one surface of the second electrode collector; and a separator disposed between the first and second electrode plates and insulating the first and second electrode plates, wherein the first electrode plate includes a first electrode tab that extends from a side surface of the first electrode collector, the first electrode coating portion extends to an extension region of the first electrode tab, the second electrode plate includes a second electrode tab that extends from a side surface of the second electrode collector, and the second electrode coating portion extends to an extension region of the second electrode tab.

The first electrode tab may include an inclined portion that extends from an extension region of the first electrode coating portion and is inclined.

The second electrode tab may include an inclined portion that extends from an extension region of the second electrode coating portion and is inclined.

The inclined portion of the first electrode coating portion may be inclined to form an acute angle with an extension line extending from a surface of the extension region of the first electrode coating portion, and the inclined portion of the second electrode coating portion may be inclined to form an acute angle with an extension line extending from a surface of the extension region of the second electrode coating portion.

The inclined portion of the first or second electrode coating portion may be disposed between the extension region disposed on the corresponding first or second electrode tab and a non-coating portion of the corresponding first or second electrode tab.

The inclined portion of the first or second electrode coating portion may be disposed only at a predetermined position of the corresponding first or second electrode tab.

The secondary battery may further include an electrode assembly including a plurality of unit electrode assemblies that are stacked in a multi layered structure, wherein each of the unit electrode assemblies includes the first and second electrode plates and the separator.

The secondary battery may further include an electrode assembly that is formed by winding the first and second electrode plates and the separator in a jelly roll shape.

The secondary battery may further include an electrode assembly that is formed by bending the first and second electrode plates and the separator in zigzag.

The secondary battery may further include: a can receiving the electrode assembly and having opening on a side; an insulating plate inserted through the opening of the can and having a first through hole and a second through hole through which the first and second electrode tabs respectively pass; a cap plate sealing the opening of the can and including an electrode terminal and a plate electrode, the electrode terminal being electrically connected to the first electrode tab extending through the first through hole, the plate electrode being insulated from the electrode terminal and electrically connected to the second electrode tab extending through the second through hole; and a protection circuit module disposed on the cap plate and electrically connected to the electrode terminal and the plate electrode and including a control device and an external terminal, the control device controlling charge/discharge of the secondary battery, the external terminal electrically connecting the secondary battery to an external device.

The secondary battery may further include: a pouch including a main body and a cover covering the main body, the main body including a receiving part receiving the electrode assembly; and a protection circuit module connected to the extension regions of the first and second electrode tabs of the electrode assembly and including a control device and an external terminal, the control device controlling charge/discharge of the secondary battery, the external terminal electrically connecting the secondary battery to an external device, wherein an edge of the main body and an edge of the cover include sealing parts sealing the receiving part.

Another aspect is a method of fabricating an electrode plate of a secondary battery, the method including: preparing a parent electrode collector; coating a predetermined region of the parent electrode collector with a parent electrode coating portion; blowing an inclined portion of the parent electrode coating portion; and stamping the parent electrode collector coated with the parent electrode coating portion to form the electrode plate such that the inclined portion of the parent electrode coating portion is disposed on a predetermined position of an electrode tab of the electrode plate.

The electrode plate may include: an electrode collector formed by the stamping of the parent electrode collector; and the electrode tab formed by the stamping of the parent electrode collector, the electrode tab extending from a surface of the electrode collector.

The blowing of the inclined portion may include inclining the inclined portion of the parent electrode coating portion formed on the parent electrode collector.

The blowing of the inclined portion may include inclining the inclined portion of the parent electrode coating portion formed on the parent electrode collector to form an acute angle with the parent electrode collector.

The stamping of the parent electrode collector may be performed such that an electrode coating portion and an electrode collector of the electrode plate partially includes a middle portion of the parent electrode coating portion, and such that the electrode tab of the electrode plate extends from a side surface of the electrode collector and partially includes the middle portion of the parent electrode coating portion, the inclined portion connected to the middle portion, and a non-coating portion of the parent electrode collector. Another aspect is a secondary battery comprising: a first electrode plate having two opposing surfaces, wherein the first electrode plate comprises a first electrode collector and a first electrode coating portion disposed on at least one of the two surfaces of the first electrode collector; a second electrode plate having two opposing surfaces, wherein the second electrode plate comprises a second electrode collector and a second electrode coating portion disposed on at least one of the two surfaces of the second electrode collector; and a separator disposed between the first and second electrode plates and electrically insulating the first and second electrode plates from each other, wherein the first electrode plate further comprises a first electrode tab that extends from a first side surface of the first electrode collector, wherein the first side surface connects the two opposing surfaces of the first electrode collector, and wherein the first electrode coating portion extends to an extension region of the first electrode tab, wherein the second electrode plate further comprises a second electrode tab that extends from a second side surface of the second electrode collector, wherein the second side surface connects the two opposing surfaces of the second electrode collector, and wherein the second electrode coating portion extends to an extension region of the second electrode tab.

In the above battery, the extension region of the first electrode tab comprises i) a first sub-extension region which extends from the first electrode coating portion disposed on the first electrode collector and is substantially parallel with the at least one surface of the first electrode collector and ii) a second sub-extension region which extends from the first sub-extension region and is inclined with respect to the first sub-extension region.

In the above battery, the second sub-extension region forms an acute angle with respect to the first sub-extension region. In the above battery, the first electrode tab comprises a non-coating portion adjacent to the second sub-extension region. In the above battery, the extension region of the second electrode tab comprises i) a first sub-extension region which extends from the second electrode coating portion disposed on the second electrode collector and is substantially parallel with the at least one surface of the second electrode collector and ii) a second sub-extension region which extends from the first sub-extension region and is inclined with respect to the first sub-extension region.

In the above battery, the second sub-extension region forms an acute angle with respect to the first sub-extension region. In the above battery, the second electrode tab comprises a non-coating portion adjacent to the second sub-extension region. The above battery further comprises an electrode assembly including a plurality of unit electrode assemblies that are stacked in a multi layered structure, wherein each of the unit electrode assemblies comprises the first and second electrode plates and the separator.

The above battery further comprises: a can accommodating the electrode assembly, wherein an opening is defined on a side of the can; an insulating plate inserted through the opening of the can, wherein first and second through holes are defined in the insulating plate, and wherein the first and second electrode tabs pass through the first and second through holes, respectively; a cap plate sealing the opening of the can and comprising an electrode terminal and a plate electrode, wherein the electrode terminal is electrically connected to the first electrode tab extending through the first through hole, and wherein the plate electrode is insulated from the electrode terminal and electrically connected to the second electrode tab; and a protection circuit module disposed on the cap plate and electrically connected to the electrode terminal and the plate electrode, wherein the protection circuit module comprises a control device and an external terminal, wherein the control device is configured to control charge/discharge of the secondary battery, and wherein the external terminal is configured to electrically connect the secondary battery to an external device.

The above battery further comprises: a pouch comprising a main body and a cover covering the main body, wherein the main body comprises a receiving portion configured to receive the electrode assembly; and a protection circuit module connected to the extension regions of the first and second electrode tabs, wherein the protection circuit module comprises a control device and an external terminal, wherein the control device is configured to control charge/discharge of the secondary battery, wherein the external terminal is configured to electrically connect the secondary battery to an external device, and wherein an edge of the main body and an edge of the cover comprise sealing parts sealing the receiving part.

The above battery further comprises an electrode assembly in which the first and second electrode plates and the separator are wound into a jelly roll shape. The above battery further comprises an electrode assembly in which the first and second electrode plates and the separator are bent into a zigzag shape.

Another aspect is a method of fabricating an electrode plate of a secondary battery, the method comprising: providing a parent electrode collector; coating an electrode active material on a predetermined region of the parent electrode collector so as to form a parent electrode coating portion on the parent electrode collector, wherein the parent electrode coating portion comprises an edge region which is thicker than the remaining region of the parent electrode coating portion; blowing the edge region of the parent electrode coating portion; and stamping the parent electrode collector including the parent electrode coating portion so as to form an electrode plate such that the edge region of the parent electrode coating portion is disposed on at least part of an electrode tab of the electrode plate.

In the above method, the stamping comprises: first stamping the parent electrode collector so as to form an electrode collector; and second stamping the parent electrode collector such that the electrode tab extends from a surface of the electrode collector. In the above method, the blowing comprises inclining at least part of the edge region of the parent electrode coating portion with respect to the remaining region of the parent electrode coating portion. In the above method, the inclined portion forms an acute angle with respect to the remaining region of the parent electrode coating portion.

In the above method, the stamping is performed such that an electrode coating portion and an electrode collector of the electrode plate partially includes a middle region of the parent electrode coating portion, and such that the electrode tab of the electrode plate extends from a side surface of the electrode collector and partially includes i) the middle region of the parent electrode coating portion, ii) an inclined portion extending from the middle portion, and iii) a non-coating portion of the parent electrode collector adjacent to the inclined portion.

Another aspect is a secondary battery comprising: an electrode collector having i) two opposing surfaces and ii) a side surface, wherein the side surface is substantially perpendicular to and connects the two opposing surfaces; an electrode tab extending from the side surface of the electrode collector; and an electrode active material coated on i) at least one of the two surfaces of the electrode collector and ii) at least part of the electrode tab.

In the above battery, the electrode active material is coated on only part of the electrode tab, and wherein the electrode active material is continuously coated from the at least one surface of the electrode collector to the part of the electrode tab. In the above method, the electrode active material coated on the electrode tab comprises i) a first region which is substantially parallel with the at least one surface of the electrode collector and ii) a second region extends from the first region and is inclined with respect to the first region.

BRIEF DESCRIPTION OF THE DRAWINGS

FIGS. 2A through 5B are schematic views illustrating a method of fabricating an electrode plate of a secondary battery according to an embodiment.

DETAILED DESCRIPTION OF CERTAIN INVENTIVE EMBODIMENTS

An electrode assembly for a secondary battery is formed by alternately disposing a positive electrode plate and a negative electrode plate. In this case, electrode coating portions are disposed on surfaces of each of the positive electrode plate and the negative electrode plate.

Characteristics of the secondary battery may be improved as coating uniformity of the electrode coating portions provided to the positive electrode plate and the negative electrode plate is increased.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1A:
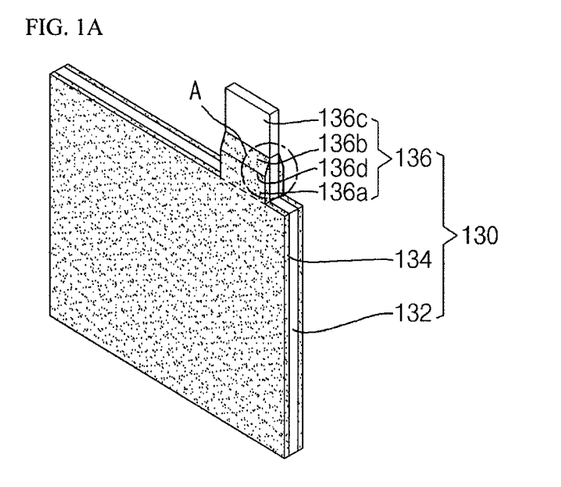
FIGS. 1A and 1B are perspective views illustrating an electrode plate of a secondary battery according to an embodiment.
Figure 1B:
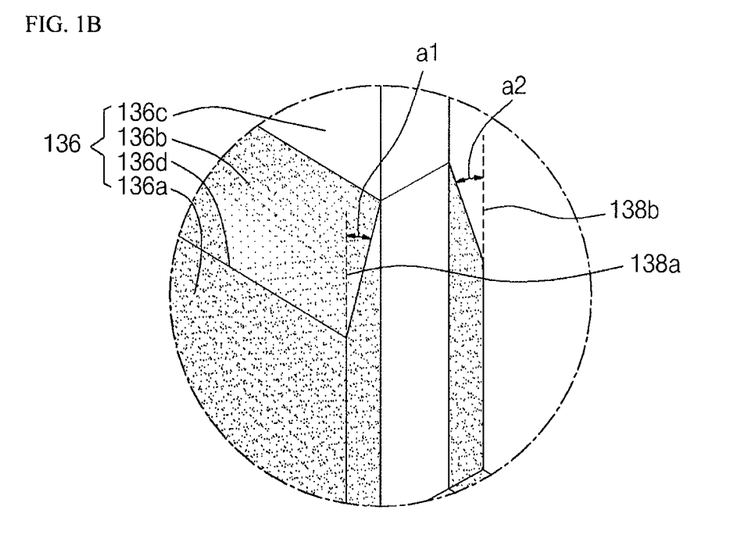

FIG. 1A is a perspective view illustrating an electrode plate of a secondary battery according to an embodiment. FIG. 1B is an enlarged view illustrating a portion A of FIG. 1A.

Referring to FIGS. 1A and 1B, an electrode plate 130 includes an electrode collector 132, electrode coating portions 134, and an electrode tab 136. The electrode plate 130 may include the electrode coating portions 134 on both side surfaces of the electrode collector 132.

Although the electrode coating portions 134 are disposed on both of the side surfaces of the electrode collector 132 in FIGS. 1A and 1B, the electrode coating portion 134 may be disposed on only one surface of the electrode collector 132.

The electrode tab 136 includes extension regions 136a, inclined portions 136b, and a non-coating portion 136c. The electrode tab 136 extends from a side surface of the electrode collector 132 and the electrode coating portions 134. The extension regions 136a of the electrode tab 136 include an extension region of the electrode collector 132 and extension regions of the electrode coating portions 134.

The inclined portions 136b of the electrode tab 136 extend from the extension regions 136a of the electrode tab 136. In the electrode tab 136, the extension regions 136a and the inclined portions 136b are separated by boundary lines 136d of the extension regions 136a.

The inclined portions 136b of the electrode tab 136 extend from the extension regions 136a. In one embodiment, the inclined portions 136b are inclined to form acute angles a1 and a2 with extension lines 138a and 138b extending from surfaces of the extension regions 136a as illustrated in FIG. 1B.

The inclined portions 136b of the electrode tab 136 are formed using a method of fabricating an electrode plate according to an embodiment, which will be described later with reference to FIGS. 2A through 5B.

The non-coating portion 136c of the electrode tab 136 extends from the electrode collector 132, but the electrode coating portions 134 are not disposed on the non-coating portion 136c.

FIGS. 2A through 5B are schematic views illustrating a method of fabricating an electrode plate of a secondary battery according to an embodiment. FIG. 2B is a cross-sectional view taken along line A-A' of FIG. 2A. FIG. 3B is a cross-sectional view taken along line B-B' of FIG. 3A. FIG. 4B is a cross-sectional view taken along line C-C' of FIG. 4A.

Referring to FIGS. 2A through 5B, to fabricate an electrode plate of a secondary battery according to one embodiment, a parent electrode collector 110 is prepared first.

Figure 2A:
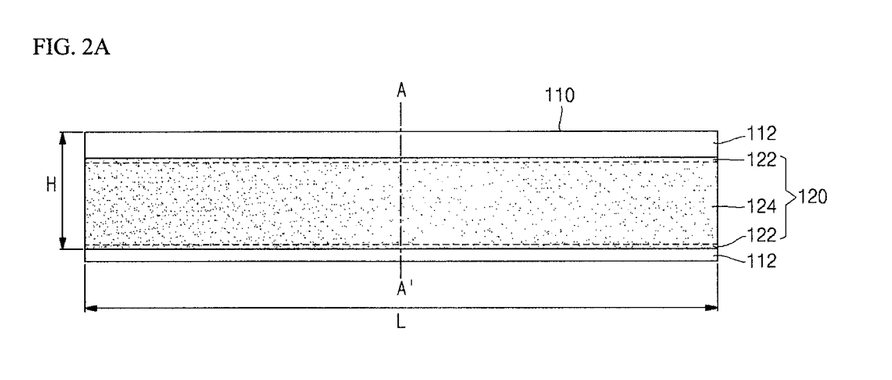

Although the parent electrode collector 110 has a rectangular shape with a predetermined height H and a predetermined length L in FIG. 2A, the present disclosure is not limited thereto. That is, the length L of the parent electrode collector 110 may be greater than that of FIG. 2A, and the height H may be substantially equal to the length L to form a true square.

Figure 2B:
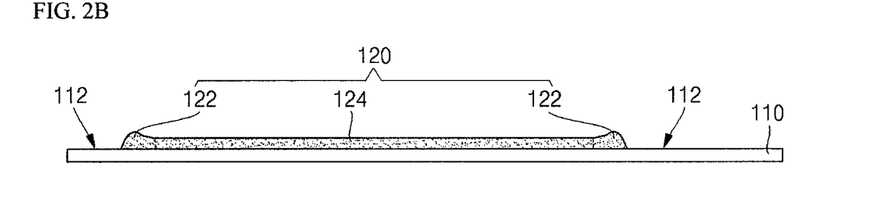

Then, a parent electrode coating portion 120 is formed in a predetermined region on a surface of the parent electrode collector 110. In one embodiment, the parent electrode coating portion 120 is formed in slurry form to be applied in the predetermined region of the parent electrode collector 110. The parent electrode coating portion 120 is applied along the length L.

For convenience in description, both edges of the parent electrode coating portion 120 are defined as inclined portions 122, the rest of the parent electrode coating portion 120 except for the inclined portions 122 is defined as a middle portion 124. Further, the rest portions of the parent electrode collector 110 except for the parent electrode coating portion 120 are defined as non-coating portions 112. Although the non-coating portions 112 are disposed outside both of the inclined portions 122 in FIG. 2A, the non-coating portion 112 may be disposed outside one of the inclined portions 122, that is, only one of both edges of the parent electrode collector 110.

In one embodiment, when the parent electrode coating portion 120 is formed on the parent electrode collector 110, predetermined regions of both edges of the parent electrode coating portion 120, that is, the inclined portions 122 protrude in convex shape relative to the middle portion 124 of the parent electrode coating portion 120. This is because the parent electrode coating portion 120 is applied in slurry form on the parent electrode collector 110, and then spread with a knife or spatula along the length L of the parent electrode collector 110 such that the middle portion 124 of the parent electrode coating portion 120 is flat. The coating material (slurry) of the parent electrode coating portion 120 may be uniformly coated on the electrode collector 110 by the spreading along the length (L).

Figure 3A:
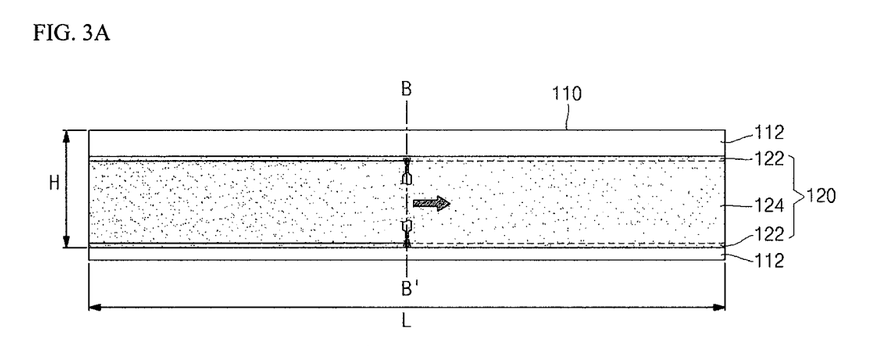
Figures 3B, 4A:
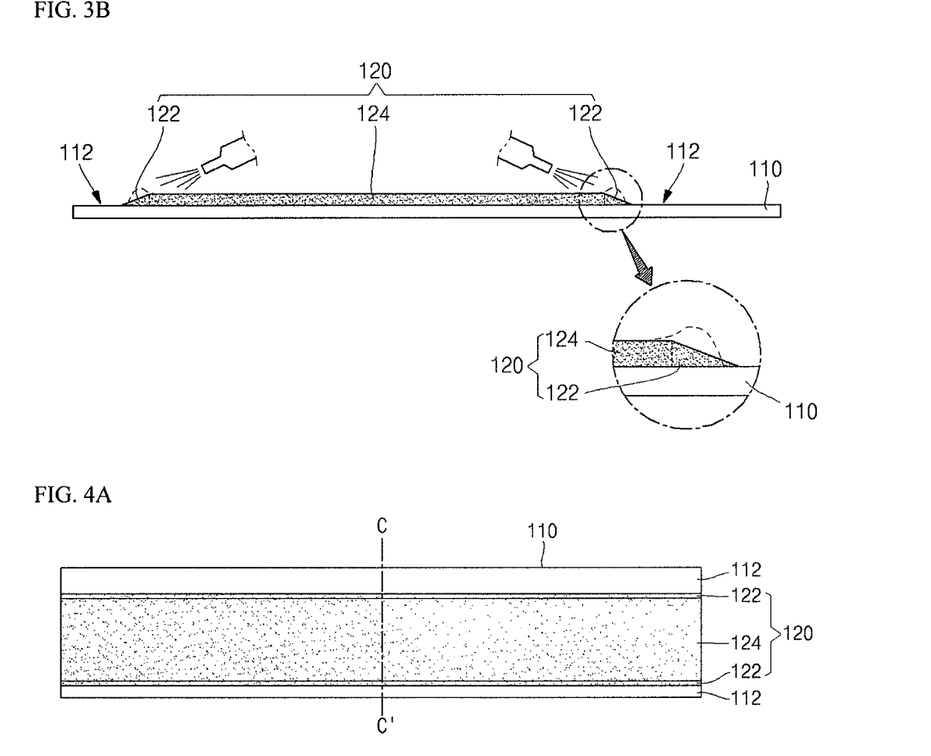

In one embodiment, after the parent electrode coating portion 120 is formed, a process of blowing the inclined portions 122 of the parent electrode coating portion 120 formed on the parent electrode collector 110 is performed.

In the blowing process, the inclined portions 122 of the parent electrode coating portion 120 are blown with, for example, air or inert gas to lower the convex regions of the inclined portions 122 as illustrated in FIGS. 3A and 3B. The blowing process is performed along the length L of the parent electrode collector 110.

In this case, the convex regions (depicted with dotted lines in FIGS. 3A and 3B) disposed at the inclined portions 122 extend from the middle portion 124, and are transformed to inclined regions (depicted with solid lines in FIGS. 3A and 3B) as illustrated in FIGS. 3A and 3B.

In one embodiment, after the blowing process, the inclined portions 122 of the parent electrode coating portion 120 form acute angles, i.e., smaller angles than 90 degrees with the surface of the parent electrode collector 110.

Figure 4B:
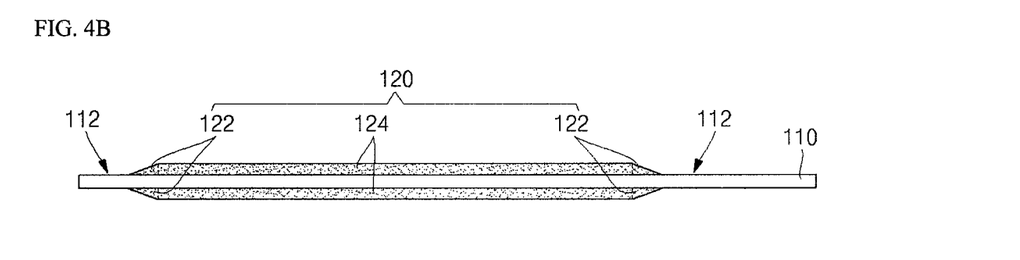

Next, if necessary, as illustrated in FIGS. 4A and 4B, the parent electrode coating portion 120 may be formed on another surface of the parent electrode collector 110. Further, the blowing process may be performed using the aforementioned methods, so as to form the parent electrode coating portion 120 including the middle portion 124 and the inclined portions 122 on the parent electrode collector 110.

Figure 5A:
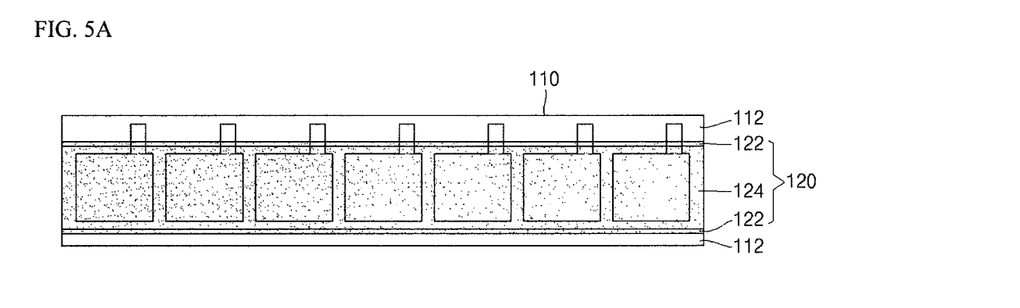
Figure 5B:
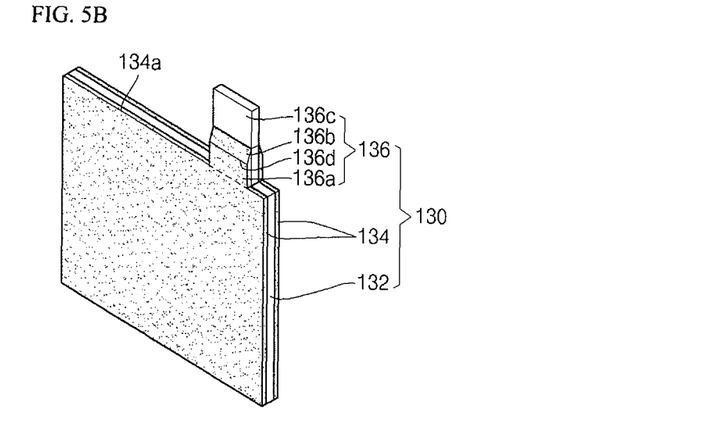

In one embodiment, the parent electrode collector 110 with the parent electrode coating portions 120 is stamped such that the inclined portions 122 of the parent electrode coating portions 120 are disposed at predetermined positions of the electrode tab 136, so as to complete the electrode plate 130. At this point, the inclined portions 136b are disposed only at the predetermined positions of the electrode tab 136 of the electrode plate 130.

The stamping may be performed by cutting the parent electrode collector 110 with a mold (not shown). That is, the electrode plate 130 illustrated in FIG. 5B may be formed by cutting the parent electrode collector 110 with the parent electrode coating portions 120 using a mold having the shape of the electrode plate 130.

At this point, the electrode plate 130 includes the electrode collector 132, the electrode coating portions 134, and the electrode tab 136. The electrode collector 132 is formed by stamping the parent electrode collector 110 in the middle portions 124 of the parent electrode coating portions 120. The electrode coating portions 134 are formed by stamping the middle portions 124 of the parent electrode coating portions 120 through the stamping process.

Through the stamping process, the electrode tab 136 includes the extension regions 136a, the inclined portions 136b, and the non-coating portion 136c. That is, the extension regions 136a of the electrode tab 136 are formed by stamping the middle portions 124 of the parent electrode coating portions 120 on the electrode tab 136. The extension regions 136a of the electrode tab 136 partially include the middle portions 124 of the electrode coating portions 134.

The inclined portions 136b are formed by stamping the inclined portions 122 of the parent electrode coating portions 120 within the predetermined positions of the electrode tab 136. The non-coating portion 136c is formed by stamping the non-coating portion 112 of the parent electrode collector 110 within the predetermined positions of the electrode tab 136.

Although the electrode tab 136 includes the extension regions 136a illustrated in FIG. 5B, the electrode tab 136 may exclude the extension regions 136a when the electrode plate 130 is stamped in the state where upper edge lines 134a of the electrode coating portions 134 are aligned with the boundary lines 136d of the inclined portions 136b. However, since it may be substantially difficult to align the upper edge lines 134a of the electrode coating portions 134 with the boundary lines 136d of the inclined portions 136b in the stamping process, the electrode tab 136 includes the extension regions 136a.

Figure 6:
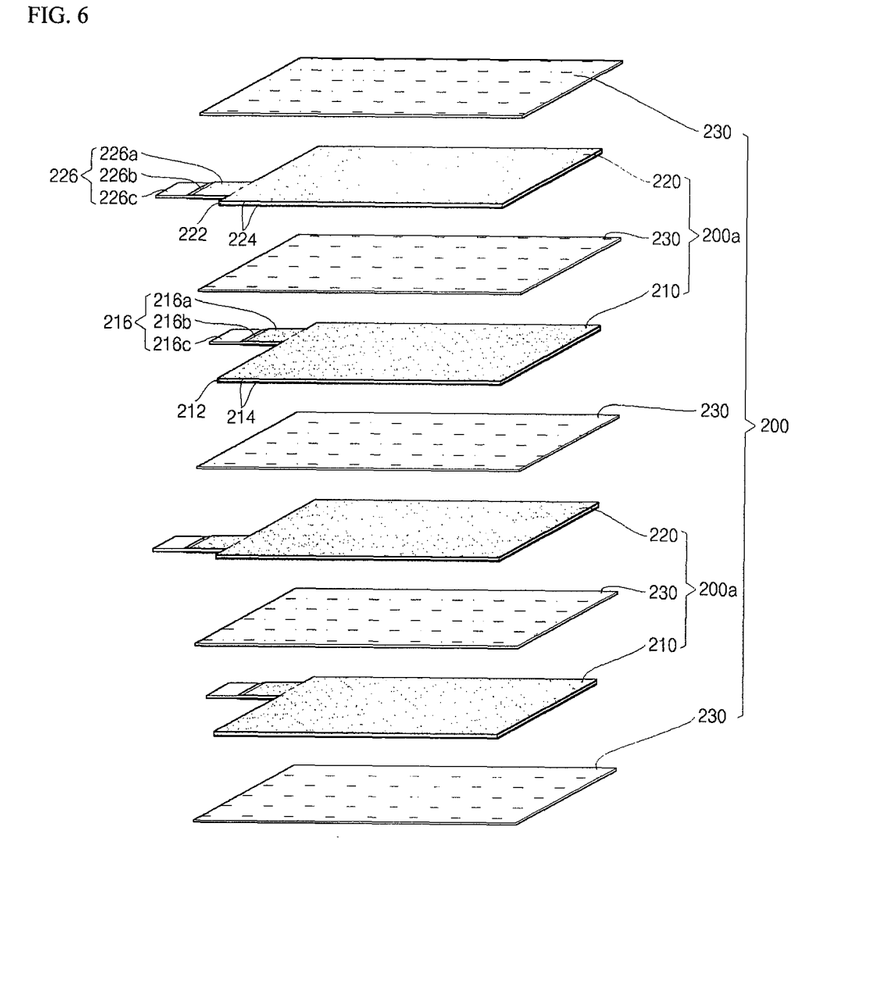
FIG. 6 is a schematic view illustrating an electrode assembly including electrode plates fabricated using a method of fabricating an electrode plate of a secondary battery, according to an embodiment.

FIG. 6 is a schematic view illustrating an electrode assembly including electrode plates fabricated using a method of fabricating an electrode plate of a secondary battery, according to an embodiment.

Referring to FIG. 6, an electrode assembly 200 may be formed by stacking a first electrode plate 210 and a second electrode plate 220 that are fabricated using the method described with reference to FIGS. 2A through 5B.

That is, the first electrode plate 210, which is a positive electrode plate, may be fabricated by forming the parent electrode collector 110 as a positive electrode collector formed of, e.g., aluminum (Al) and by forming the parent electrode coating portions 120 of positive electrode active materials.

The second electrode plate 220, which is a negative electrode plate, may be fabricated by forming the parent electrode collector 110 as a negative electrode collector formed of, e.g., copper (Cu) and by forming the parent electrode coating portions 120 of negative electrode active materials. The first electrode plate 210 and the second electrode plate 220 are respectively a positive electrode plate and a negative electrode plate in the current embodiment. However, the first electrode plate 210 and the second electrode plate 220 may be respectively a negative electrode plate and a positive electrode plate. In this case, the corresponding electrode collectors and electrode coating portions are reversed.

The first electrode plate 210 includes i) a first electrode collector 212, ii) first electrode coating portions 214, and iii) a first electrode tab 216. The first electrode tab 216 includes i) first extension regions 216a, ii) first inclined portions 216b, and iii) a first non-coating portion 216c, which are formed using the method described with reference to FIGS. 2A through 5B.

The second electrode plate 220 includes i) a second electrode collector 222, ii) second electrode coating portions 224, and iii) a second electrode tab 226. The second electrode tab 226 includes i) second extension regions 226a, ii) second inclined portions 226b, and iii) a second non-coating portion 226c, which may be formed using the method described with reference to FIGS. 2A through 5B.

When the first electrode plates 210 and the second electrode plates 220 fabricated using the aforementioned method are stacked, unit electrode assemblies 200a with separators 230 being disposed between the first and second electrode plates 210 are stacked in a multi layered structure, so as to form the electrode assembly 200.

In the electrode assembly 200 as illustrated in FIG. 6, the separator 230 may be disposed between the unit electrode assemblies 200a to insulate the space between the unit electrode assemblies 200a. The separators 230 may be disposed on the uppermost and lowermost portions of the electrode assembly 200 to insulate the electrode assembly 200 from the outside.

In one embodiment, the electrode assembly 200 is completed by aligning the first electrode plates 210, the separators 230, and the second electrode plates 220, and then, by welding the separators 230.

Figure 7A:
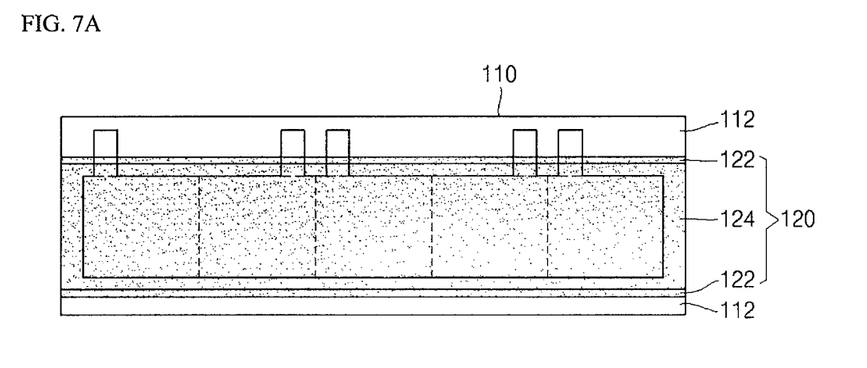
FIGS. 7A and 7B are schematic views illustrating a method of fabricating an integrated electrode plate of a secondary battery according to an embodiment.
Figure 7B:
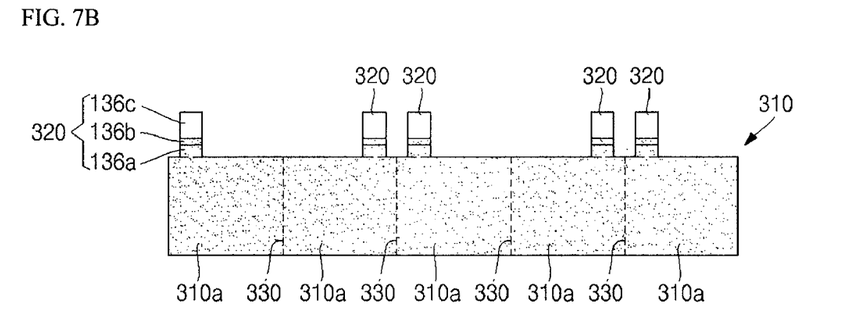

FIGS. 7A and 7B are schematic views illustrating a method of fabricating an integrated electrode plate of a secondary battery according to an embodiment.

Referring to FIGS. 7A and 7B, in the method of fabricating an integrated electrode plate of a secondary battery, the parent electrode coating portions 120 including the middle portions 124 and the inclined portions 122 are formed on the parent electrode collector 110 using the method described with reference to FIGS. 2A through 4B.

Next, the parent electrode collector 110 with the parent electrode coating portions 120 is stamped to form an integrated electrode plate 310.

At this point, the integrated electrode plate 310 has an elongated width as illustrated in FIG. 6B. The integrated electrode plate 310 includes a plurality of electrode tabs 320 on a side surface.

In one embodiment, the inclined portions 136b are stamped at predetermined positions of the electrode tabs 320 such that the integrated electrode plate 310 includes the electrode tabs 320 including the extension regions 136a, the inclined portions 136b, and the non-coating portions 136c as shown in FIG. 5B.

In one embodiment, the integrated electrode plate 310 includes unit electrode plates 310a. In this embodiment, the unit electrode plates 310a are bent in zigzag to form an electrode assembly 400 as illustrated in FIG. 8, which will be described later.

The integrated electrode plate 310 is divided by dotted lines 330 that are illustrated as reference lines in FIG. 7B, and each of the unit electrode plates 310a corresponds in configuration to the electrode plate 130 of FIG. 5B.

Figure 8:
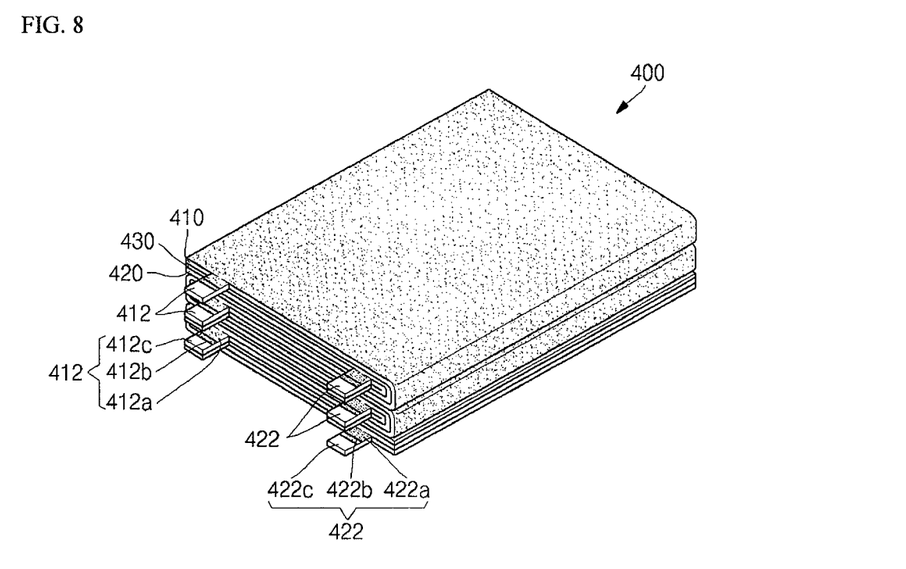
FIG. 8 is a schematic view illustrating a method of forming an electrode assembly that includes integrated electrode plates fabricated using the method of FIGS. 7A and 7B.

FIG. 8 is a schematic view illustrating a method of forming an electrode assembly that includes integrated electrode plates fabricated using the method of FIGS. 7A and 7B.

Referring to FIG. 8, the electrode assembly 400 may be formed by bending a first electrode plate 410 and a second electrode plate 420 in zigzag. The first and second electrode plates 410 and 420 are fabricated, for example, using the method described with reference to FIGS. 7A and 7B.

That is, the first electrode plate 410, which is a positive electrode plate, may be fabricated by forming the parent electrode collector 110 as a positive electrode collector formed of, e.g., aluminum (Al) and by forming the parent electrode coating portions 120 of positive electrode active materials.

The second electrode plate 420, which is a negative electrode plate, may be fabricated by forming the parent electrode collector 110 as a negative electrode collector formed of, e.g., copper (Cu) and by forming the parent electrode coating portions 120 of negative electrode active materials. The first electrode plate 410 and the second electrode plate 420 are respectively a positive electrode plate and a negative electrode plate in the current embodiment. However, the first electrode plate 410 and the second electrode plate 420 may be respectively a negative electrode plate and a positive electrode plate. In this case, the corresponding electrode collectors and electrode coating portions are reversed.

The first electrode plate 410 includes first electrode tabs 412 that have first extension regions 412a, first inclined portions 412b, and first non-coating portions 412c. The first electrode tabs 412 are formed, for example, using the method described with reference to FIGS. 7A and 7B.

The second electrode plate 420 includes second electrode tabs 422 that have second extension regions 422a, second inclined portions 422b, and second non-coating portions 422c. The second electrode tabs 422 may be formed using the method described with reference to FIGS. 7A and 7B.

The first and second electrode plates 410 and 420 fabricated using the aforementioned method are prepared, a separator 430 is disposed at least between the first and second electrode plates 410 and 420. The first and second electrode plates 410 and 420 and the separator 430 are simultaneously bent in zigzag to form the electrode assembly 400.

Figure 9A:
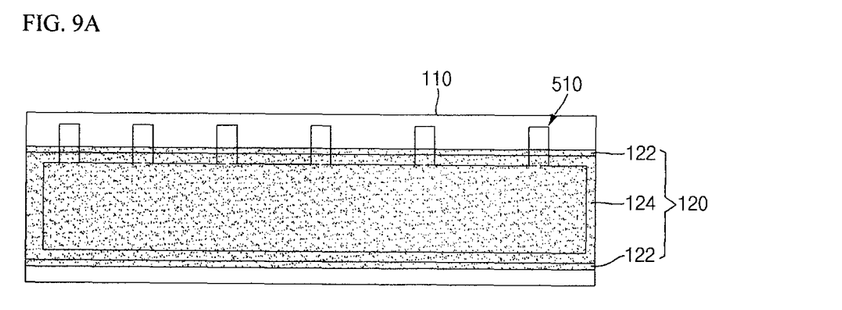
FIGS. 9A and 9B are schematic views illustrating a method of fabricating an integrated electrode plate of a secondary battery according to another embodiment.
Figure 9B:
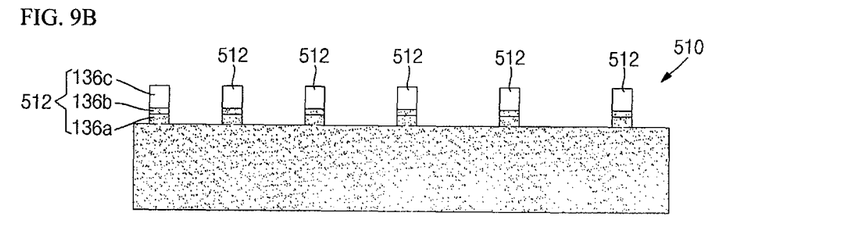

FIGS. 9A and 9B are schematic views illustrating a method of fabricating an integrated electrode plate of a secondary battery according to another embodiment.

Referring to FIGS. 9A and 9B, in the method of fabricating an integrated electrode plate of a secondary battery, the parent electrode coating portions 120 including the middle portions 124 and the inclined portions 122 are formed on the parent electrode collector 110 using the method described with reference to FIGS. 2A through 4B.

Next, the parent electrode collector 110 with the parent electrode coating portions 120 is stamped to form the integrated electrode plate 510.

At this point, the integrated electrode plate 510 has an elongated width as illustrated in FIG. 9B. The integrated electrode plate 510 includes a plurality of electrode tabs 512 on a side surface.

In one embodiment, the inclined portions 136b are stamped at predetermined positions of the electrode tabs 320 such that the integrated electrode plate 510 includes the electrode tabs 512, including the extension regions 136a, the inclined portions 136b, and the non-coating portions 136c as shown in FIG. 5B.

At this point, distances between the electrode tabs 512 extending from a side surface of the integrated electrode plate 510 are increased from the left side to the right side since the integrated electrode plate 510 is wound in a predetermined direction, that is, from the left side to the right side as illustrated in FIG. 9B.

Figure 10:
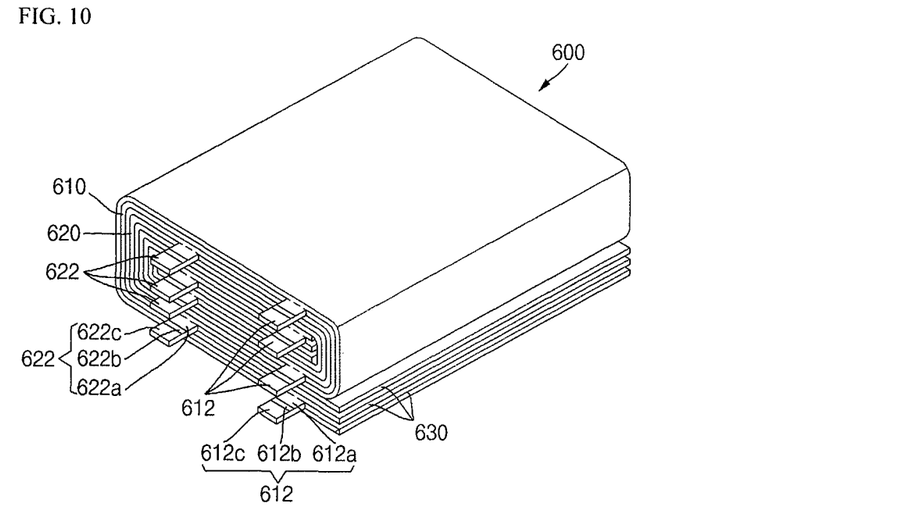
FIG. 10 is a schematic view illustrating a method of forming an electrode assembly that includes integrated electrode plates fabricated using the method of FIGS. 9A and 9B.

FIG. 10 is a schematic view illustrating a method of forming an electrode assembly that includes integrated electrode plates fabricated using the method of FIGS. 9A and 9B.

Referring to FIG. 10, an electrode assembly 600 may be formed by winding a first electrode plate 610 and a second electrode plate 620 in a jelly roll shape. The first and second electrode plates 610 and 620 may be fabricated using the method described with reference to FIGS. 9A and 9B.

That is, the first electrode plate 610, which is a positive electrode plate, may be fabricated by forming the parent electrode collector 110 as a positive electrode collector formed of, e.g., aluminum (Al) and by forming the parent electrode coating portions 120 of positive electrode active materials.

The second electrode plate 620, which is a negative electrode plate, may be fabricated by forming the parent electrode collector 110 as a negative electrode collector formed of, e.g., copper (Cu) and by forming the parent electrode coating portions 120 of negative electrode active materials. The first electrode plate 610 and the second electrode plate 620 are respectively a positive electrode plate and a negative electrode plate in the current embodiment. However, the first electrode plate 610 and the second electrode plate 620 may be respectively a negative electrode plate and a positive electrode plate. In this case, the corresponding electrode collectors and electrode coating portions are reversed.

The first electrode plate 610 includes first electrode tabs 612 that have i) first extension regions 612a, ii) first inclined portions 612b, and iii) first non-coating portions 612c. The first electrode tabs 612 may be formed using the method described with reference to FIGS. 9A and 9B.

The second electrode plate 620 includes second electrode tabs 622 that have i) second extension regions 622a, ii) second inclined portions 622b, and iii) second non-coating portions 622c. The second electrode tabs 622 are formed using the method of forming the electrode tabs 520 including the extension regions 136a, the inclined portions 136b, and the non-coating portions 136c as described with reference to FIGS. 9A and 9B.

The first and second electrode plates 610 and 620 fabricated using the aforementioned method are prepared. Separators 630 are disposed on the upper portion of the first electrode plate 610, between the first and second electrode plates 610 and 620, and on the lower portion of the second electrode plate 620. Then, the first and second electrode plates 610 and 620 and the separators 630 are simultaneously wound in a jelly roll shape to form the electrode assembly 600.

Figure 11:
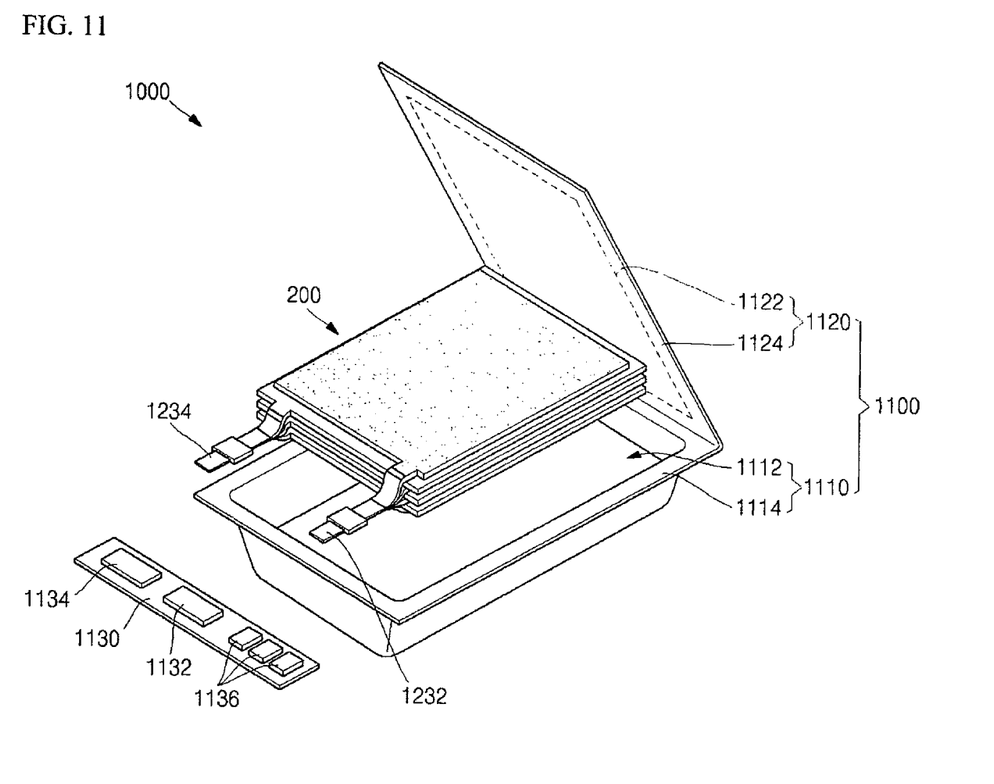
FIG. 11 is a perspective view illustrating a secondary battery according to an embodiment.

FIG. 11 is a perspective view illustrating a secondary battery according to an embodiment. Referring to FIG. 11, a secondary battery 1000 includes the electrode assembly 200 described with reference to FIG. 6. Although not shown in FIG. 11, the secondary battery 1000 may include the electrode assembly 400 described with reference to FIG. 8, or the electrode assembly 600 described with reference to FIG. 10.

For convenience, the electrode assembly 200 described with reference to FIG. 6 is illustrated in FIG. 11, and descriptions with respect to the electrode assembly 200 described with reference to FIG. 6 will be made in FIG. 11.

The secondary battery 1000 includes a pouch 1100 and the electrode assembly 200 stored in the pouch 1100. The pouch 1100 includes a main body 1110 and a cover 1120. The main body 1110 includes a receiving part 1112 that is a space for receiving the electrode assembly 200, and a sealing part 1114 that extends and expands from an opening of the receiving part 1112.

The cover 1120 extends from an edge of the sealing part 1114 of the main body 1110. In one embodiment, the cover 1120 entirely covers the receiving part 1112 of the main body 1110, and simultaneously seals the sealing part 1114 of the main body 1110. Thus, the cover 1120 includes a receiving part cover region 1122 corresponding to the receiving part 1112 of the main body 1110, and a sealing part 1124 corresponding to the sealing part 1114 of the main body 1110.

In one embodiment, the secondary battery 1000 is formed by storing the electrode assembly 200 in the receiving part 1112 of the main body 1110, by closing the receiving part 1112 with the cover 1120, and by sealing the sealing part 1114 of the main body 1110 and the sealing part 1124 of the cover 1120 using a method such as heat welding.

After the pouch 1100 is sealed, a first electrode lead 1232 and a second electrode lead 1234 extend out of the electrode assembly 200. The first electrode lead 1232 and the second electrode lead 1234 are connected to a protection circuit module 1130.

The protection circuit module 1130 controls charge and discharge of the electrode assembly 200, and operation of the secondary battery 1000. The protection circuit module 1130 includes a control device 1132 such as an integrated circuit (IC) device, a secondary protection device 1134 that prevents an overcurrent from flowing into the secondary battery 1000, and external terminals 1136 that connect the secondary battery 1000 to an external device.

Figure 12:
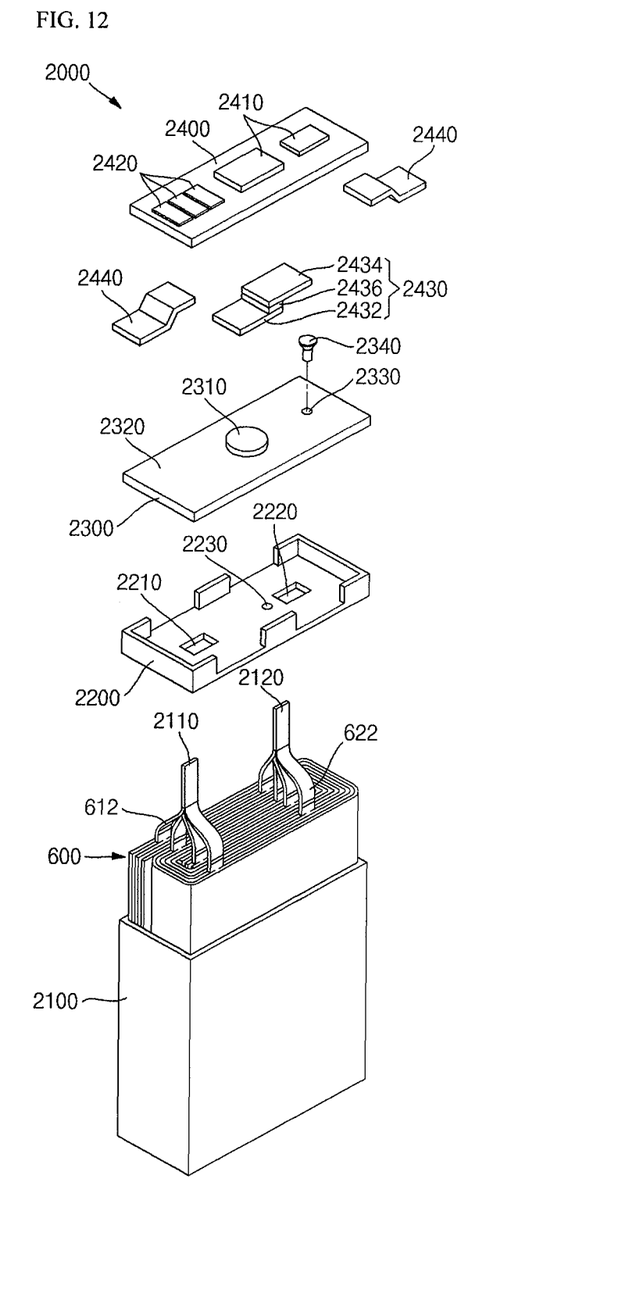
FIG. 12 is a perspective view illustrating a secondary battery according to another embodiment.

FIG. 12 is a perspective view illustrating a secondary battery according to another embodiment. Referring to FIG. 12, a secondary battery 2000 includes the electrode assembly 500 described with reference to FIG. 10. Although not shown in FIG. 12, the secondary battery 2000 may include the electrode assembly 200 described with reference to FIG. 6, or the electrode assembly 600 described with reference to FIG. 10.

For convenience, the electrode assembly 600 described with reference to FIG. 10 is illustrated in FIG. 12, and descriptions with respect to the electrode assembly 600 described with reference to FIG. 10 will be made in FIG. 12.

In the secondary battery 2000, the electrode assembly 600 is stored in a can 2100 having an opening that is open in a predetermined direction. The electrode assembly 600 includes a first lead 2110 electrically connected to the first electrode tabs 612, and a second lead 2120 electrically connected to the second electrode tabs 622.

An insulating case 2200 is inserted through the opening of the can 2100 receiving the electrode assembly 600. The insulating case 2200 prevents shaking of the electrode assembly 600 in the can 2100, and insulates the space between the electrode assembly 600 and a cap plate 2300 that will be described later.

The insulating case 2200 has a first through hole 2210 and a second through hole 2220 through which the first and second leads 2110 and 2120 respectively pass, and an electrolyte injection hole 2230 for injecting electrolyte.

The cap plate 2300 covers the opening of the can 2100 storing the electrode assembly 600 to seal the can 2100. The cap plate 2300 includes an electrode terminal 2310 at a predetermined position. The electrode terminal 2310 is insulated from a plate terminal 2320 that is out of the predetermined position of the cap plate 2300. The cap plate 2300 has an electrolyte injection hole 2330 at a predetermined position. The electrolyte injection hole 2330 is a hole for injecting electrolyte. The electrolyte injection hole 2330 is sealed with an injection hole plug 2330 when injection of electrolyte is completed.

The electrode terminal 2310 is electrically connected to the first lead 2110 of the electrode assembly 600. The plate terminal 2320 is electrically connected to the second lead 2120. The secondary battery 2000 includes a protection circuit module 2400 that controls charge/discharge and operation of the secondary battery 2000.

The protection circuit module 2400 includes a control device 2410 such as an integrated circuit (IC) device, and external terminals 2420 that connect the secondary battery 2000 to an external device. The protection circuit module 2400 is electrically connected to the electrode terminal 2310 and the plate terminal 2320.

A secondary protection device 2430 may be disposed between the protection circuit module 2400 and the electrode terminal 2310 to prevent an overcurrent from flowing into the secondary battery 2000.

The secondary protection device 2430 includes a first terminal lead 2432 connected to the electrode terminal 2310, a second terminal lead 2434 connected to the protection circuit module 2400, and a positive temperature coefficient device 2436 disposed between the first and second terminal leads 2432 and 2434.

The protection circuit module 2400 is electrically connected to the plate terminal 2320. The electrical connection between the protection circuit module 2400 and the plate terminal 2320 is formed by connection members 2440. The connection members 2440 may be connected to the protection circuit module 2400 using a method such as soldering, and be connected to the plate terminal 2320 using a method such as soldering, laser welding, and resistance welding, or through a coupling member such as a bolt.

According to at least one embodiment, since coating material is formed in a portion of the electrode tab which contributes to uniform spreading of the coating material on the entire are of the electrode collector, uniformity between the electrode plates is achieved. Further, the electrode coating portions are uniformly disposed on the electrode plates.

According to one embodiment, the parent electrode collector including the electrode coating portions in predetermined regions is stamped to form the electrode plates including the electrode tabs, so that the inclined portions of the electrode coating portions are disposed at predetermined positions of the electrode tabs.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery comprising:
    a first electrode plate having two opposing surfaces, wherein the first electrode plate comprises a first electrode collector and a first electrode coating portion disposed on at least one of the two surfaces of the first electrode collector;
    a second electrode plate having two opposing surfaces, wherein the second electrode plate comprises a second electrode collector and a second electrode coating portion disposed on at least one of the two surfaces of the second electrode collector; and
    a separator disposed between the first and second electrode plates and electrically insulating the first and second electrode plates from each other,
    wherein the first electrode plate and the second electrode plate further comprise a first electrode tab and a second electrode tab, respectively,
    wherein the first electrode tab extends from the first electrode collector, and wherein the first electrode coating portion extends to and is formed on at least one of a top or bottom surface of the first electrode tab,
    wherein the second electrode tab extends from the second electrode collector, wherein the second electrode coating portion extends to and is formed on at least one of a top or bottom surface of the second electrode tab, and
    wherein the first electrode tab comprises an extension region which is extended from the first electrode coating portion, and wherein the extension region of the first electrode tab comprises i) a first sub-extension region which extends from the first electrode coating portion disposed on the first electrode collector and is substantially parallel with the at least one surface of the first electrode collector and ii) a second sub-extension region which extends from the first sub-extension region and is inclined with respect to the first sub-extension region.

2. The secondary battery as claimed in claim 1, wherein the second sub-extension region forms an acute angle with respect to the first sub-extension region.

3. The secondary battery as claimed in claim 1, wherein the first electrode tab comprises a non-coating portion adjacent to the second sub-extension region.

4. A secondary battery comprising:
    a first electrode plate having two opposing surfaces, wherein the first electrode plate comprises a first electrode collector and a first electrode coating portion disposed on at least one of the two surfaces of the first electrode collector;
    a second electrode plate having two opposing surfaces, wherein the second electrode plate comprises a second electrode collector and a second electrode coating portion disposed on at least one of the two surfaces of the second electrode collector; and
    a separator disposed between the first and second electrode plates and electrically insulating the first and second electrode plates from each other,
    wherein the first electrode plate and the second electrode plate further comprise a first electrode tab and a second electrode tab, respectively,
    wherein the first electrode tab extends from the first electrode collector, and wherein the first electrode coating portion extends to and is formed on at least one of a top or bottom surface of the first electrode tab,
    wherein the second electrode tab extends from the second electrode collector, wherein the second electrode coating portion extends to and is formed on at least one of a top or bottom surface of the second electrode tab,
    wherein the first electrode tab comprises an extension region which is extended from the first electrode coating portion, and wherein the extension region of the second electrode tab comprises i) a first sub-extension region which extends from the second electrode coating portion disposed on the second electrode collector and is substantially parallel with the at least one surface of the second electrode collector and ii) a second sub-extension region which extends from the first sub-extension region and is inclined with respect to the first sub-extension region.

5. The secondary battery as claimed in claim 4, wherein the second sub-extension region forms an acute angle with respect to the first sub-extension region.

6. The secondary battery as claimed in claim 4, wherein the second electrode tab comprises a non-coating portion adjacent to the second sub-extension region.

7. The secondary battery as claimed in claim 1, further comprising an electrode assembly including a plurality of unit electrode assemblies that are stacked in a multi layered structure, wherein each of the unit electrode assemblies comprises the first and second electrode plates and the separator.

8. The secondary battery as claimed in claim 7, further comprising:
    a can accommodating the electrode assembly, wherein an opening is defined on a side of the can;
    an insulating plate inserted through the opening of the can, wherein first and second through holes are defined in the insulating plate, and wherein the first and second electrode tabs pass through the first and second through holes, respectively;
    a cap plate sealing the opening of the can and comprising an electrode terminal and a plate electrode, wherein the electrode terminal is electrically connected to the first electrode tab extending through the first through hole, and wherein the plate electrode is insulated from the electrode terminal and electrically connected to the second electrode tab; and a protection circuit module disposed on the cap plate and electrically connected to the electrode terminal and the plate electrode, wherein the protection circuit module comprises a control device and an external terminal, wherein the control device is configured to control charge/discharge of the secondary battery, and wherein the external terminal is configured to electrically connect the secondary battery to an external device.

9. The secondary battery as claimed in claim 7, further comprising:

a pouch comprising a main body and a cover covering the main body, wherein the main body comprises a receiving portion configured to receive the electrode assembly; and a protection circuit module connected to the extension regions of the first and second electrode tabs, wherein the protection circuit module comprises a control device and an external terminal, wherein the control device is configured to control charge/discharge of the secondary battery, wherein the external terminal is configured to electrically connect the secondary battery to an external device, and wherein an edge of the main body and an edge of the cover comprise sealing parts sealing the receiving part.

10. The secondary battery as claimed in claim 1, further comprising an electrode assembly in which the first and second electrode plates and the separator are wound into a jelly roll shape.

11. The secondary battery as claimed in claim 1, further comprising an electrode assembly in which the first and second electrode plates and the separator are bent into a zigzag shape.

* * * * *